(12) United States Patent
Jin et al.

(10) Patent No.: US 6,398,424 B1
(45) Date of Patent: Jun. 4, 2002

(54) RUGGED TYPE MULTI-CHANNEL OPTICAL CONNECTOR

(75) Inventors: Yong-Sung Jin; Hyung-Jae Lee; Yung-Sung Son, all of Sunnyvale, CA (US)

(73) Assignee: PhotonAge, Inc., Fremont, CA (US)

( * ) Notice: Subject to any disclaimer, the term of this patent is extended or adjusted under 35 U.S.C. 154(b) by 34 days.

(21) Appl. No.: 09/608,478

(22) Filed: Jun. 30, 2000

(51) Int. Cl.⁷ .............................. G02B 6/36; G02B 6/38
(52) U.S. Cl. .............................. 385/83; 385/59; 385/65; 385/89; 385/92
(58) Field of Search .............................. 385/76–78, 80, 385/81, 83–86, 88–92, 59, 60, 63, 64, 65

(56) References Cited

U.S. PATENT DOCUMENTS

| | | | | |
|---|---|---|---|---|
| 5,896,479 A | * | 4/1999 | Vladic | 385/59 |
| 6,000,858 A | * | 12/1999 | Bloom | 385/94 |
| 6,293,708 B1 | * | 10/2001 | Ohtsuka | 385/72 |

\* cited by examiner

*Primary Examiner*—Brian Healy
*Assistant Examiner*—Kevin S Wood
(74) *Attorney, Agent, or Firm*—Skjerven Morrill LLP; Gary J. Edwards

(57) ABSTRACT

A multi-channel optical connector that includes a multi channel optical fiber block including at least one optical fiber capable of being optically coupled to at least one optical device. The multi-channel optical fiber block is incorporated in a plastic molding that is complimentary in shape to that of an optical device array block, and thus can be plugged into the optical device array block. The close tolerances maintained in manufacturing of the connector results in accurate alignment of the fibers captured in the multi-channel optical fiber block with the optical devices in the optical device array block. The close tolerances can be achieved by using MEMS (Micro Electro Mechanical System) processing techniques to manufacture the V-grooves in a silicon V-block, which is part of the multi-channel optical fiber block. Alternatively, V-grooves can be produced in the multi-channel optical fiber block by plastic molding. The connector includes a housing that surrounds the connector core and the buffered fiber that is outside the cable jacket to providing protection and strain relief for the fibers.

13 Claims, 12 Drawing Sheets

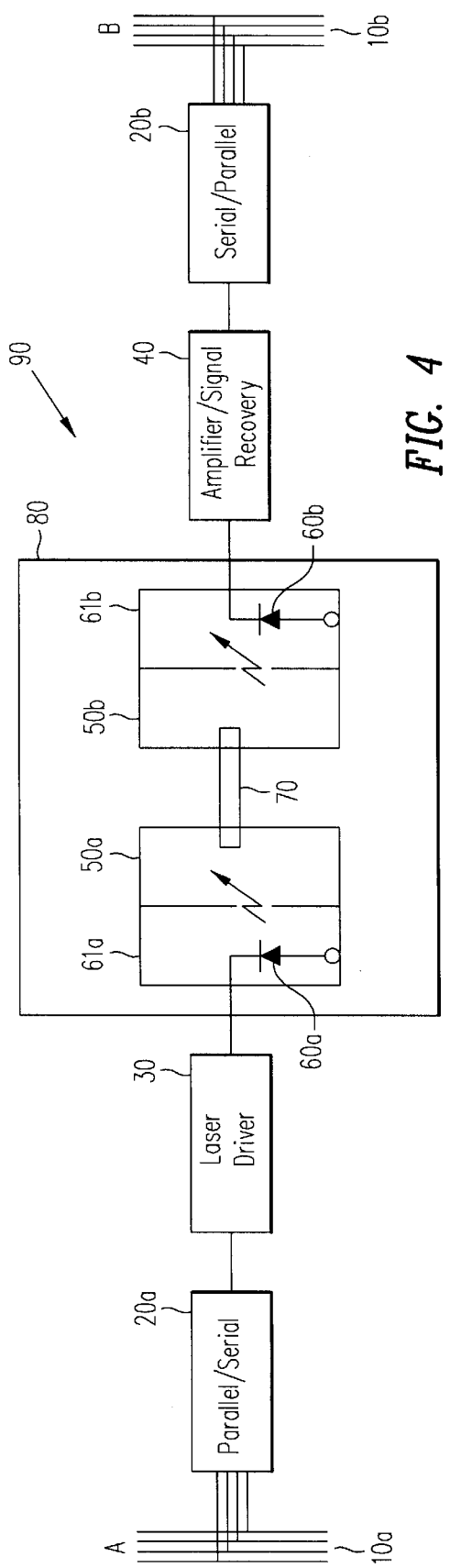
FIG. 4
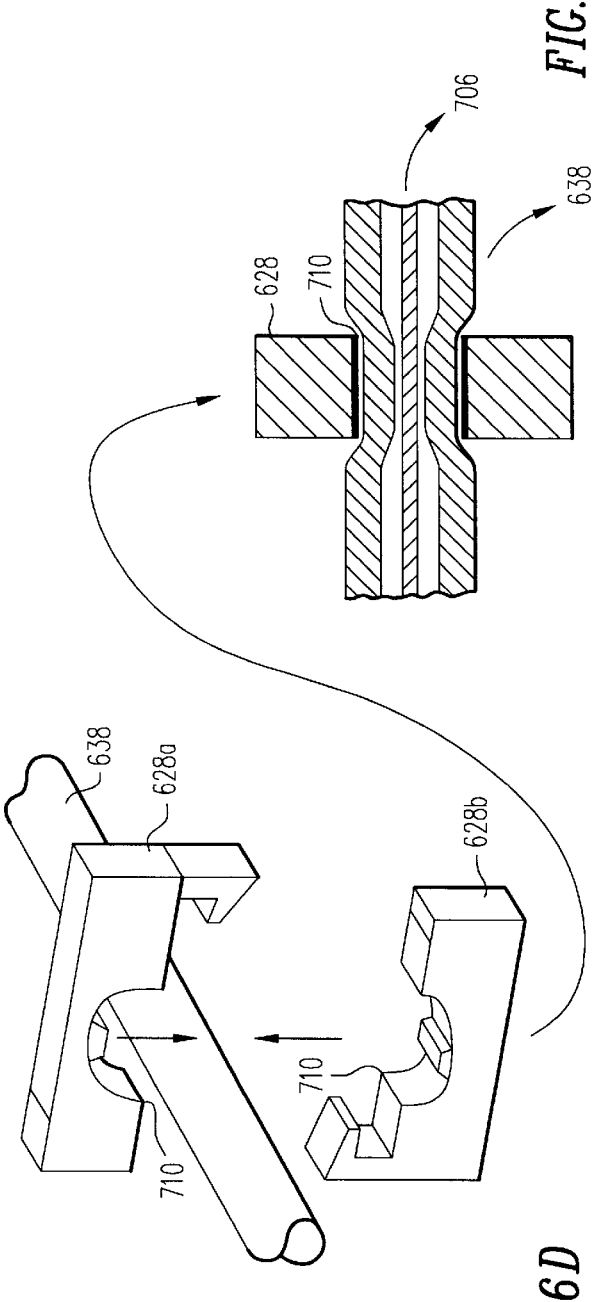
FIG. 6D
FIG. 6E

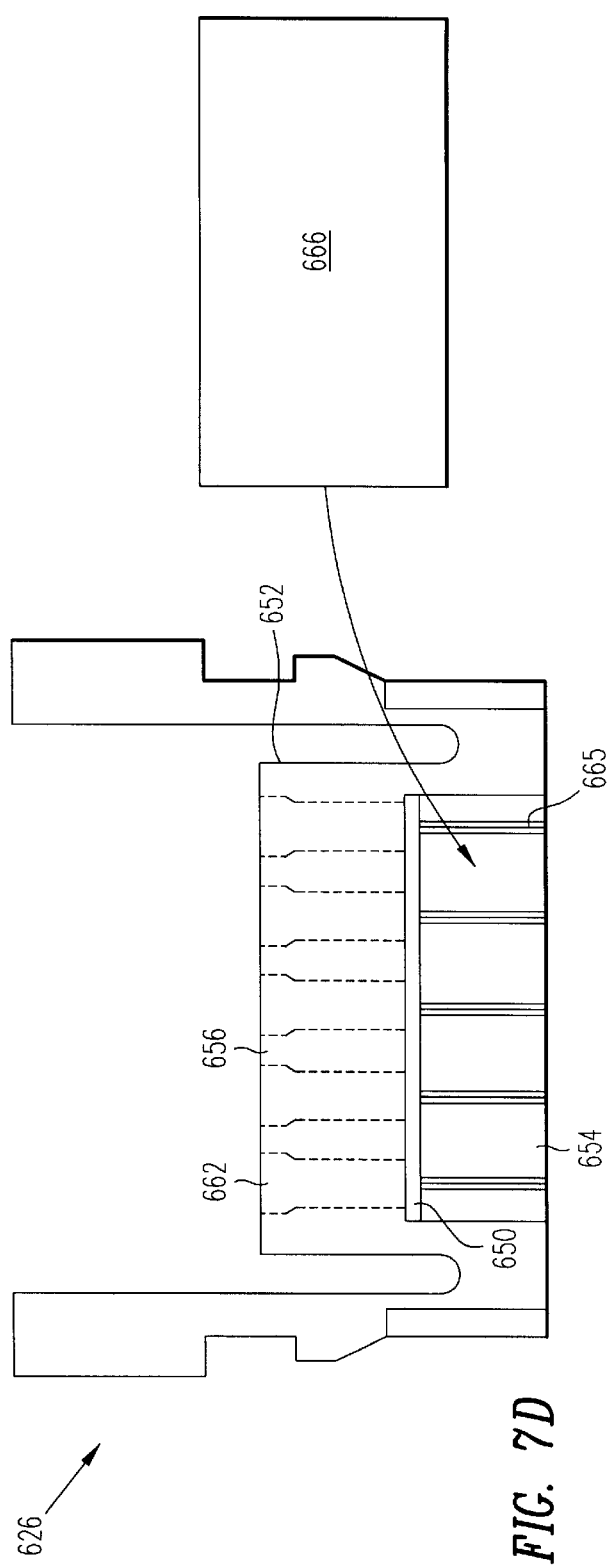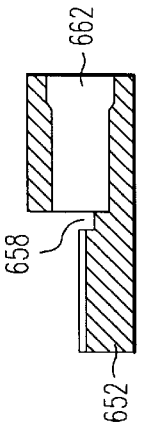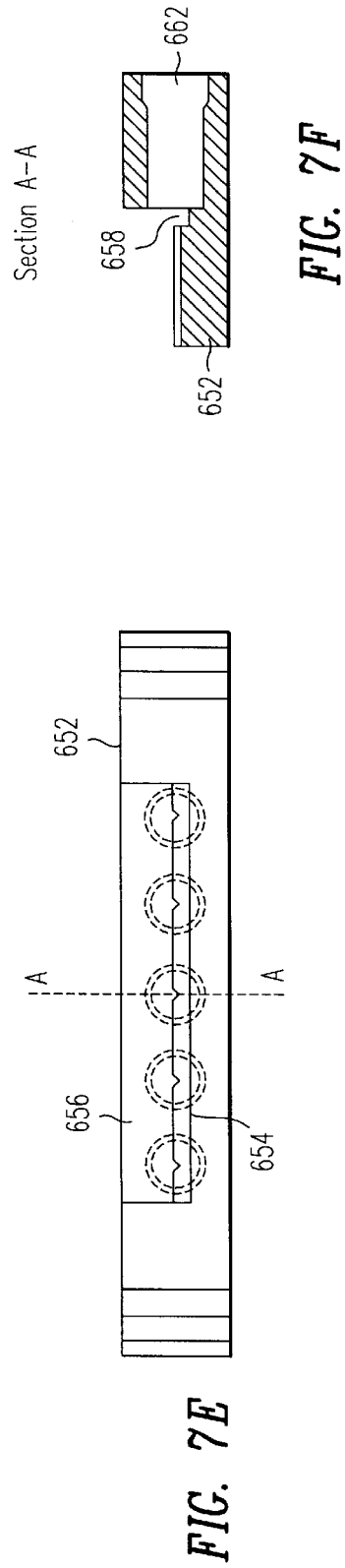

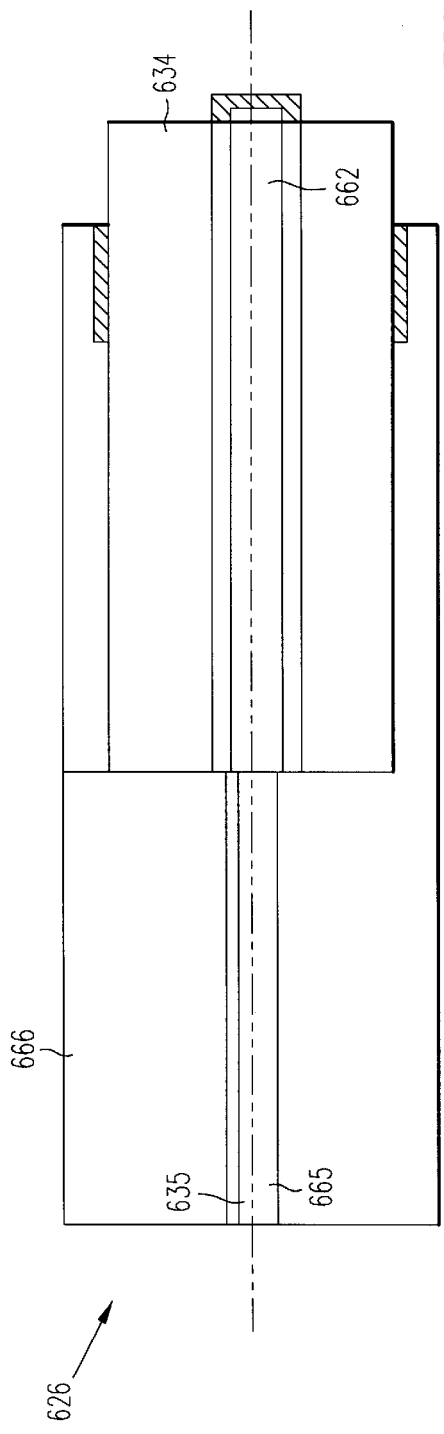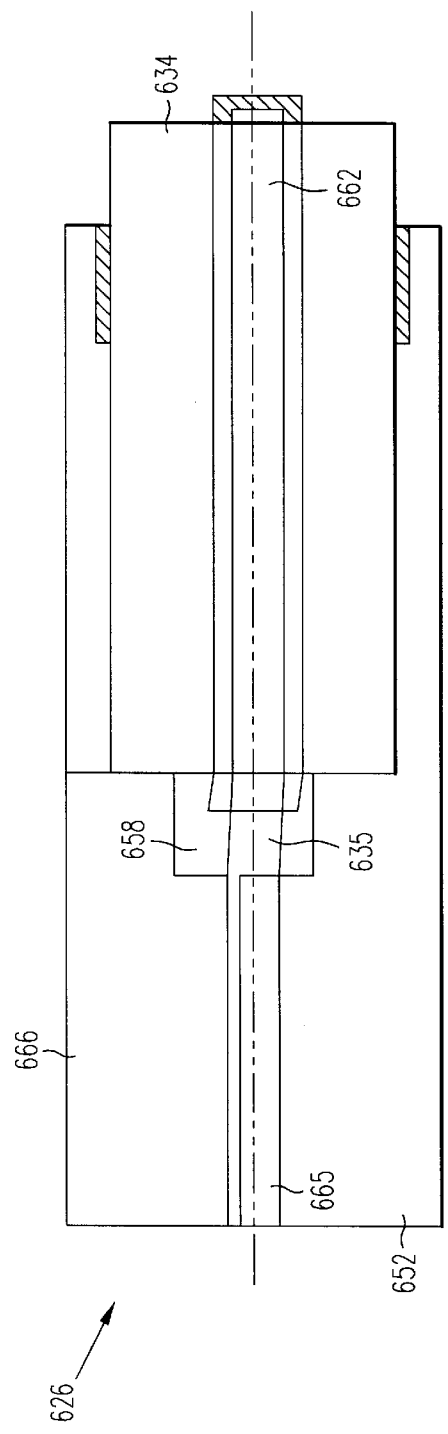

RUGGED TYPE MULTI-CHANNEL OPTICAL CONNECTOR

CROSS REFERENCE TO RELATED APPLICATION

This application relates to and incorporates by reference in its entirety the commonly-assigned copending U.S. patent application entitled "Multichannel Optical Transmitter/Receiver Module and Manufacturing Method Thereof" Ser. No. 09/608,207, filed Jun. 30, 2000.

BACKGROUND OF THE INVENTION

1. Field of the Invention

The present invention relates to a multi-channel optical connector and, more particularly, to a rugged-type multi-channel optical connector for use with optical transmitter modules and optical receiver modules.

2. Description of the Related Art

Recently, communication systems designers are vigorously adapting their designs for the use of optical fiber technology in various communication fields. Optical communication systems enable use of high frequency signals and suffer less signal loss than conductor based technologies and are therefore better suited for the high bandwidth communications that are increasingly in demand. Optical communication systems are suitable to use in high speed-long distance transmission systems.

During optical transmission of data, one channel of serial data is generally utilized for transmitting parallel data on N channels. In this case, the transmission speed of the serial data should be at least N times faster than each of the parallel data channels. High speed transmission circuits require expensive equipment; therefore, multiple transmission channels are often utilized to reduce the burden of a high speed transmitting circuit. In order to use multiple optical channels, a plurality of optical transmission systems, each including a light source, an optical fiber, and light detector, are required. For multi-channel optical transmitter/receiver modules, an accurate alignment of optical fibers with sources and detector is required not only for each channel but also for adjacent channels. Therefore, multi-channel optical transmitter/receiver modules need an optical connector which is highly accurate and, consequently, is more complicated than that of a single channel optical transmitter/receiver module.

FIG. 1 is an exemplary schematic diagram illustrating an active alignment method for a multi channel optical connector 101 and laser diodes 100. In order to arrange laser diodes 100, for example, with respect to optical fibers 110, laser diodes 100 are first fixed so that they are separated by regular, usually uniform, intervals. Next, optical fibers 110 are fixed on a block 120 having grooves with the same regular intervals with which the laser diodes have been fixed. Then, laser diodes 100 and optical fibers 110 are aligned by moving block 120 with respect to laser diodes 100. Block 120 can be moveable in all three directions. An optimal alignment between optical fibers 110 and laser diodes 100 can be achieved by monitoring the optical output power from each optical fiber of optical fibers 110 while moving block 120. When the output power from each of the optical fibers 110 is maximized, block 120 can be fixed relative to diodes 100. This method is referred to as the active alignment method because the maximum output power is sought by monitoring the optical output power from fibers 110. The active alignment method can approach the optimum arrangement, however it requires expensive equipment and a lot of labor hours to accomplish. Further, the active alignment method does not lend itself to systems where plugable connectors are desirable.

FIG. 2 is an exemplary schematic diagram illustrating a passive alignment method for a multi channel optical connector 201 and optical devices 200. In contrast to the active alignment method illustrated in FIG. 1, the passive alignment method does not include monitoring optical output power. Multi channel optical connector 201 includes an optical device array block 210 with optical devices 200, each electrically coupled to one of electrical conductors 211, arranged to have regular, uniform, intervals. Multi channel optical connector 201 also includes a multi channel optical fiber block 220 having optical fibers 221 arranged with the same regular intervals as that of optical devices 200 of optical device array block 210. Optical device array block 210 can be fixed on a substrate (not shown) by soldering. Multi channel optical fiber block 220 can be plugable. Optical fibers 221 are then aligned with optical devices 200 when multi channel optical fiber block 220 is plugged into optical device array block 210. Optical devices 200 can be laser diodes or photodiodes. Even though the passive alignment method is not optimized as with the active alignment method, it has the advantage of being faster (requiring fewer labor hours), requires less expensive equipment, and therefore is less expensive to perform.

FIG. 3 illustrates a conventional method of assembling connector 201 of FIG. 2. Typically, an optical transmitter/receiver module will include two connectors such as connector 201 of FIG. 2, arranged such that light sources in one module are coupled with light detectors in the other module via optical fibers. Optical fibers 320 are inserted in grooves 311 on a connector block 310. Optical fibers 320 can be multi mode or single mode optical fibers. Grooves 311 guide optical fibers 320 into holes 322, typical 250 $\mu$m diameter holes, in connector block 310. Grooves 311 have uniform intervals between any two adjacent grooves 311. Optical fibers 320 are fixed in place by a cover 300, which can also be grooved with grooves 312 having the same uniform intervals as connector block 310. Connector block 310 is usually made from a plastic material for ease of manufacturing and lowered cost. End facets 321 of optical fibers 320 are usually smoothly polished in order to facilitate the coupling of light into and out of optical fibers 320.

TABLE 1 shows the result of a calculation for an allowable tolerance of the alignment depending on the various diameters of optical fibers and a coupling efficiency between the optical fiber and the optical devices. The calculations in TABLE 1 are based on several parameters. The allowable tolerance for alignment between a laser diode and an optical fiber is based on the requirement that more than about 90% of the maximum optical output of the laser diode be coupled into the optical fiber. The allowable tolerance of alignment between an optical fiber and a photo diode is based on the requirement that more than about 90% of the maximum light output from the optical fiber be coupled into the photo diode. The divergence angle of the laser diode beam is assumed to be about 15°. The diameter of the light receiving aperture of the photodiode is assumed to be about 200 $\mu$m. Additionally, the laser diode is separated by about 450 $\mu$m from the optical fiber.

TABLE 1

| Optical fiber core diameter | Laser diode - Optical fiber Allowable tolerance of alignment | Optical fiber - Photo diode Allowable tolerance of alignment | Laser diode - Optical fiber Maximum coupling efficiency | Optical fiber - Photo diode Maximum coupling efficiency | Total maximum Coupling efficiency |
|---|---|---|---|---|---|
| 0.5 mm | ±140 µm | ±90 µm | 100% | 21% | 21% |
| 0.25 mm | ±40 µm | ±45 µm | 90% | 67% | 60% |
| 0.0625 mm | ±20 µm | ±65 µm | 16% | 100% | 16% |

If a 0.5 mm core diameter plastic optical fiber is used, it would be possible to manufacture a connector having approximately 100 µm of allowable tolerance of alignment between the optical fiber and the laser diode by plastic molding. However, only 21% of the light output from the optical fiber can be coupled into the photodiode. Alternatively, if a 0.25 mm core diameter plastic optical fiber is used, 67% of the light output from the optical fiber can be coupled to the photodiode. The decreased diameter of the optical fiber can bring three times the signal to the photo diode without increasing the output of the laser diode; however, the allowable tolerance of alignment between the optical fiber and the laser diode would be reduced by an amount 0.29 that of the 0.5 mm diameter plastic optical fiber. It is very difficult to manufacture such a connector and satisfy the allowable tolerances with plastic molding. The passive alignment method is generally accomplished with plastic optical fiber having relatively large diameters, generally about 0.51~1.0 mm, for proper transmission of the optical signal.

If a 0.0625 mm diameter multi mode silica optical fiber is used, it is extremely difficult to satisfactorily manufacture the connector with the required reduced alignment tolerances by plastic molding. However, even though the amount of the output of the laser diode actually coupled into the multi mode silica optical fiber is small, all of the light coming out from the optical fiber can be coupled into the photodiode. Thus, the maximum output of the photodiode is almost the same as that of the 0.5 mm diameter optical fiber. The silica optical fiber is essential, however, for high speed-long distance signal transmission because silica optical fiber has almost no loss of power and a high cut-off frequency compared with plastic optical fiber. One drawback of using multi mode silica fiber is the small allowable tolerance in the alignment of fiber core with the laser diode. If the tolerance is exceeded the coupling efficiency will decrease, thereby increasing the loss in signal power.

FIG. 3A shows a typical optical fiber prepared for insertion into grooves 311 of connector block 310 (FIG. 3). Optical fiber 320 is a buffered optical fiber having a buffer 340. Buffer 340, for example, can be a 900 µm diameter buffer. Buffer 340 is stripped away to expose buffer 341. Buffer 341, for example, can be a 250 µm diameter buffer. Buffer 341 is inserted into one of holes 322 in connector block 310 and is guided by grooves 311. The center of buffer 341, however, may not be aligned with the center of fiber core 343, even though holes 321 have uniform intervals. Therefore, the centers of fiber core 343 may be arranged with non-uniform intervals.

However, the center of fiber core 343 is well aligned with the center of bare fiber 342, which may be a 125 µm diameter fiber. If bare fiber 342 were placed into grooves 311 instead of buffer 341, the center of core 343 can be aligned accurately. However, it is difficult to make small diameter holes and grooves (125 µm diameters, for example) using plastic injection molding since a very small and long needle-shaped molding core, which can be easily broken, is needed. Additionally, since the small diameter buffer 341 is fixed in connector block 310 while the large diameter buffer 340 is not, stress is induced at the junction between buffer 340 and buffer 341.

FIG. 3B shows a conventional assembly of a plurality of buffered fibers 330, which can be 900 µm buffered fibers, and a conventional connector 332. Buffered fibers 330 are not enclosed in a cable sheath, and therefore are susceptible to breakage or excessive bending that can result in increased loss of power for the optical signal. Connector 332 mates with device module 334 thereby aligning the optical fibers 330 with light sources or light detectors present in the device module 334. Conventional connector 332 does not provide any strain relief mechanism, therefore any movement of connector 332 or even fibers 330 can potentially degrade the signal transmission characteristics at the interface of optical fibers 330 and the light source or the detector.

Therefore, there is need for a multi-channel optical connector capable of being precisely aligned in a fast, cost sensitive fashion to yield low loss connections especially for multimode fiber with 62.5 or 50 µm diameter. It is also desirable to use rugged cable to avoid the breakage of fibers or the excessive bending of fibers resulting in higher loss of power for the optical signal. It is also desirable to provide a strain relief to avoid variation in transmission characteristics due to forces acting on the fibers or the connector body.

BRIEF SUMMARY OF THE INVENTION

In accordance with the present invention, a multi-channel optical connector is disclosed that enables accurate alignment of optical fibers and optical devices, can have a rugged connector design that includes strain relief, and at the same time can support transmission of high frequency signals without interference or noise.

In one embodiment, the multi-channel optical connector includes a V-groove block, which can be made from silicon or plastic, and large holes for receiving at least one optical fiber so that at least one optical fiber is optically coupled to at least one optical device of a device array block. The multi channel optical connector is incorporated in a plastic molding that is complimentary in shape to the device array block, and thus can be plugged into the device array block.

In some embodiments, close tolerances are maintained in manufacturing of the multi-channel optical connector and the device array block, which results in accurate alignment of the fibers captured in the multi-channel optical connector with the optical devices in the device array block. The close tolerances can be achieved by using MEMS (Micro Electro Mechanical System) processing techniques. The bare fiber can be placed on V-grooves in the V-groove block.

The V-groove block can be made from silicon or plastic and is integrally fixed in the multi-channel optical fiber block. A buffered fiber is affixed in the multi-channel optical fiber block through holes in the multi-channel optical fiber block. The multi-channel optical fiber block also includes a trench structure between the holes and the V-grooves of the V-block so that bare fiber (e.g., 125 µm diameter) can be placed in the V-grooves while a large diameter buffer (e.g., 900 µm) is placed through the holes while reducing the stress between the buffered and unbuffered portions of the optical fibers.

The connector can also include a stopper and a housing. The stopper is fixedly attached to the sheath of a cable from which at least one of the optical fiber captured in the connector core is derived. The stopper is captured in the housing when the connector is plugged into the device module. The capturing of the stopper in the housing prevents the cable from translating or rotating and provides strain relief for the at least one optical fiber. Cable holding buttons in their locked position aid the stopper in preventing motion of the cable.

The connector is suitable for use with a cable that has a jacket enclosing buffered fibers. The buffer can be captured in the multi-channel optical connector; thus, bare fiber is not exposed to the elements, enhancing the structural ruggedness of the conductor. Additionally the housing surrounds the multi-channel optical connector and the jacketed fiber that is outside the buffer providing further protection and strain relief.

These and other embodiments of the invention are further discussed below with reference to the following figures.

BRIEF DESCRIPTION OF THE DRAWINGS

FIG. 4 shows a schematic block diagram of an optical transmitter/receiver system having an optical transmitter/receiver module according to the present inventions.

FIGS. 6D and 6E show an embodiment of placement of a stopper on a fiber cable such as the fiber cable shown in FIG. 6C.

FIGS. 7D, 7E and 7F are a plan view, an elevation, and a side view, respectively, of a second embodiment of a multi-channel optical fiber block according to the present invention.

FIG. 8A shows a side view of an assembly of a fiber in a multi-channel optical fiber block without a trench.

FIG. 8B shows a side view of an assembly of a fiber in a multi-channel optical fiber block having a trench.

Figure 1:
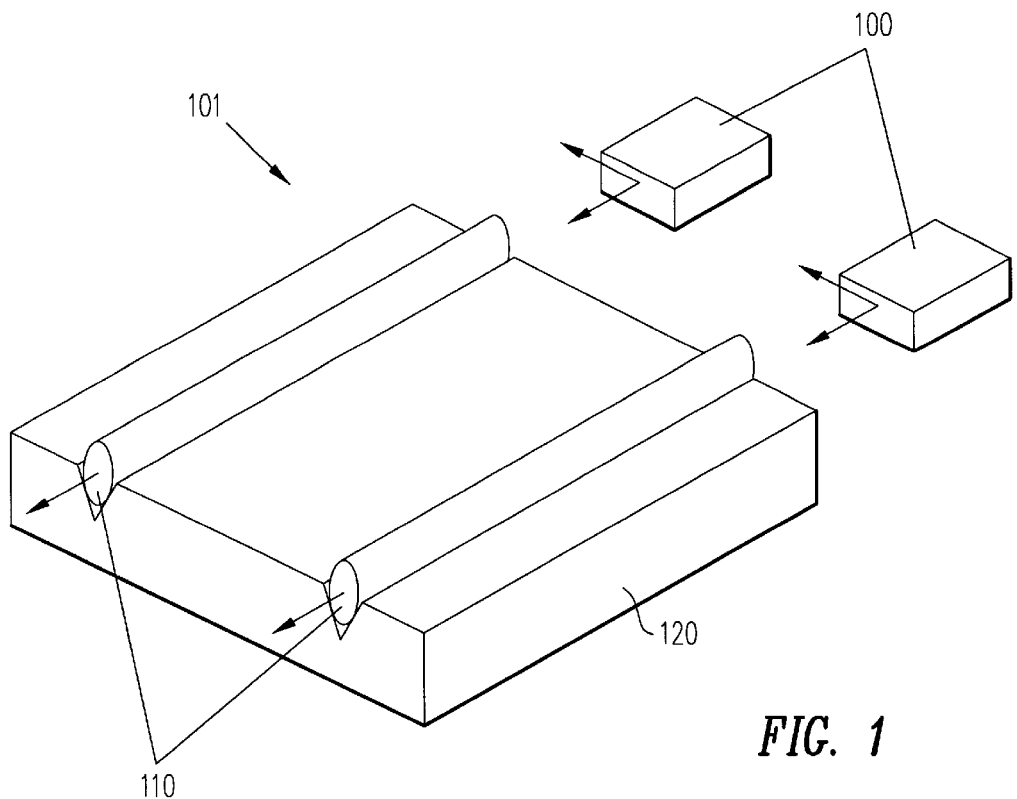
FIG. 1 shows an exemplary schematic diagram illustrating an active alignment method for a multi channel optical connector.
Figure 2:
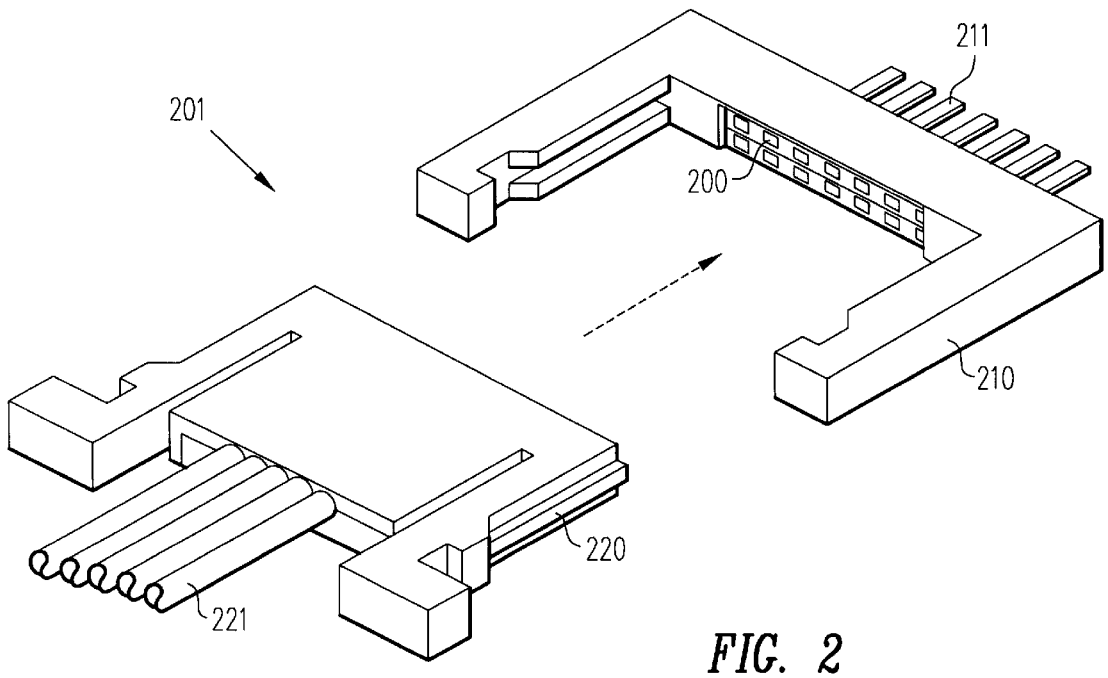
FIG. 2 shows an exemplary schematic diagram illustrating a passive alignment method for a multi channel optical transmitter.
Figure 3:
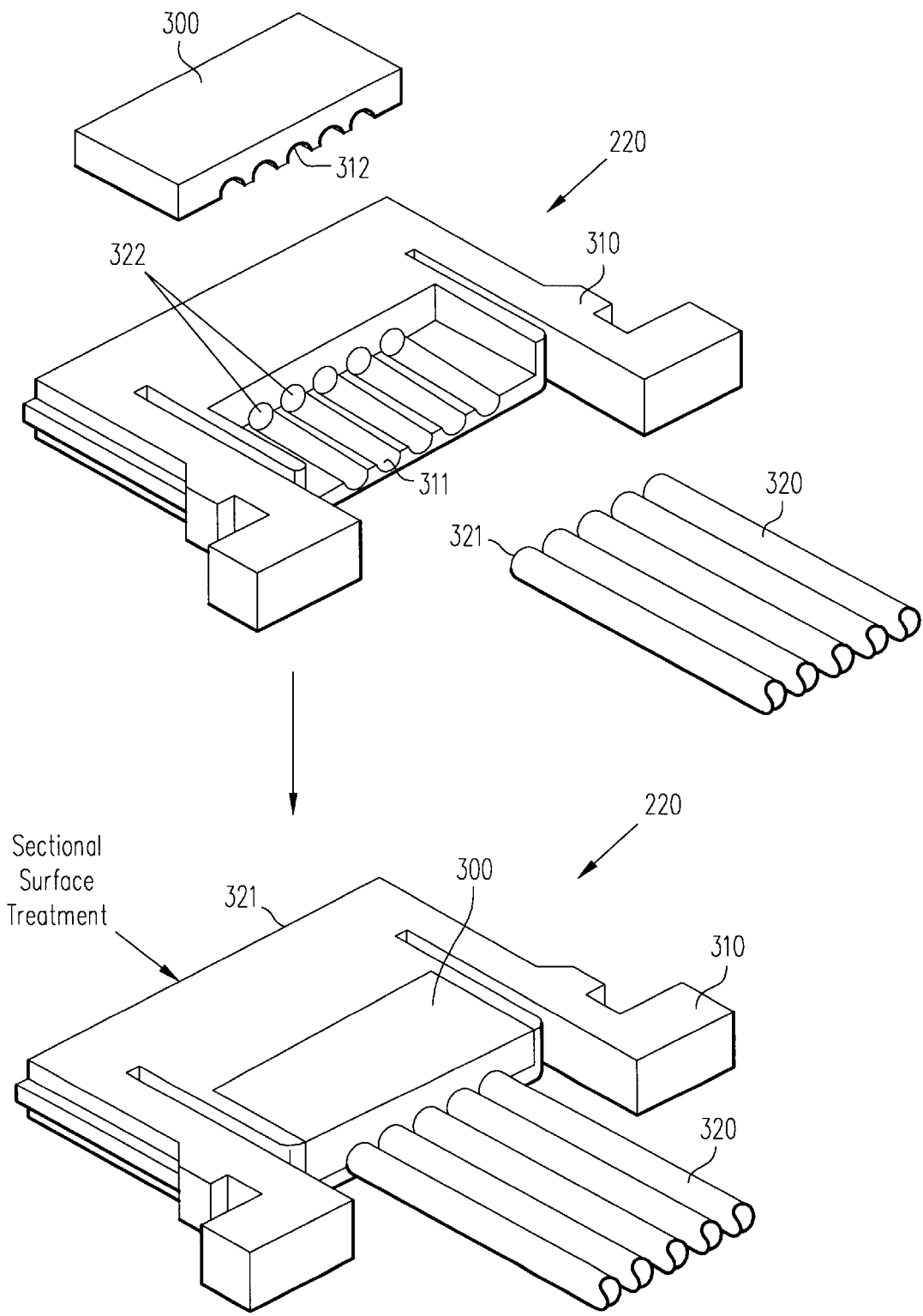
FIG. 3 shows an assembly diagram of a conventional method of implementing the passive alignment method for the multi-channel optical fiber block.
Figure 3A:
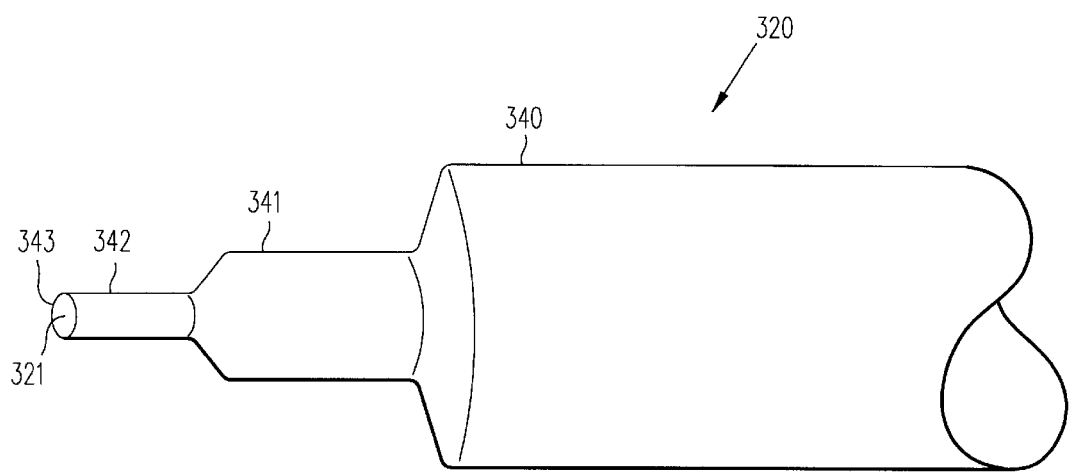
FIG. 3A shows a buffered optical fiber.
Figure 3B:
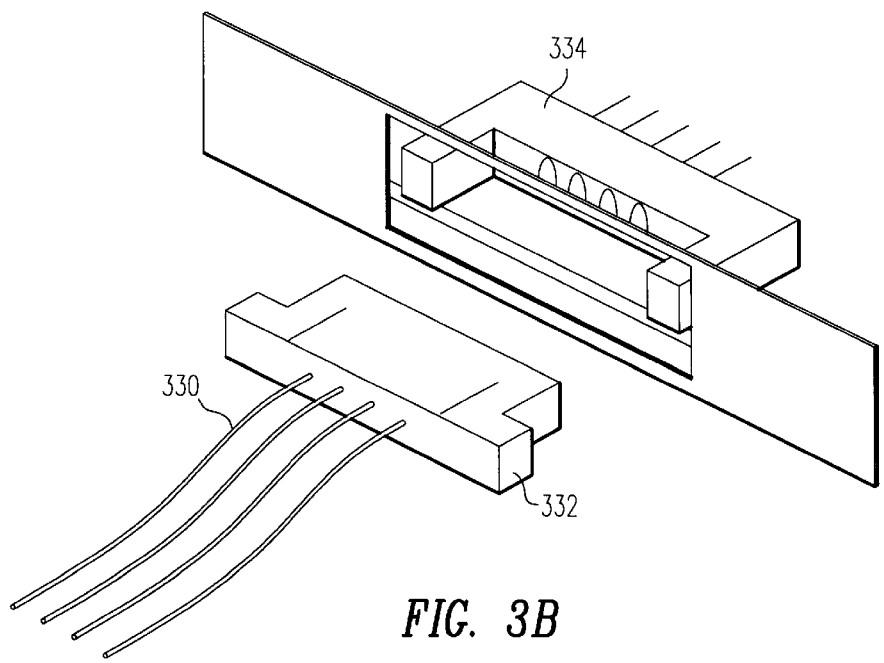
FIG. 3B shows a conventional connector assembly having buffered fibers.

In the figures, elements having the same designation in the various figures have the same or similar function.

DETAILED DESCRIPTION

FIG. 4 illustrates a schematic block diagram of an optical transmitter and receiver system 90 having a multichannel optical transmitter/receiver module 80. Module 80 includes a device module 61a having a light source 60a, a device module 61b having a detector 60b, a fiber optic cable having an optical fiber 70 and connectors 50a and 50b, one at each end of the fiber optic cable. Each module 61a and 61b can be a transmitter/receiver module and can both transmit and receive optical signals. In FIG. 4, data is transmitted from a parallel data bus 10a at point A to a parallel data bus 10b at point B through multichannel optical transmitter/receiver module 80. Parallel data from parallel data bus 10a at point A is transformed to serial data for transmission by parallel/serial converting circuit 20a. The serial data is then input to a laser driving circuit 30, which transforms electrical signals representing the serial data to optical signals by appropriately driving a light source 60a in optical device module 61a. The optical signal is transmitted to a detector 60b in optical device module 61b at a receiving site near point B through connectors 50a and 50b and optical fiber 70. Detector 60b generates electrical signals based on the transmitted optical signals. Because the electrical signals coming from photodiode 60b may be weak, the electrical signals can be amplified and restored to digital format to recover the originally transmitted electrical signals by an amplifier/signal recovery circuit 40. The recovered electrical signals are then converted back to parallel data format by a serial/parallel converting circuit 20b and coupled to parallel data bus 10b at point B. The transmission of data from point A to point B is, then, accomplished by transmitting serial data through optical fiber 70. In general, optical transmitter and receiver system 90 can transmit either parallel formatted data or serially formatted data from point A to point B. Optical device module 61a can have more than one light source 60a and may include detectors; optical device module 61b can have more than one photodiode 60b; and connector 50a and 50b can receive more than one fiber 70.

Optical transmitter/receiver module 80 converts the electrical signals representing serial data to an optical signal, transmits the optical signal over a distance, and converts the optical signal to electrical signals representing the serial data. As shown in FIG. 4, optical transmitter/receiver module 80 includes a light source 60a for converting the electrical signal to light, an optical fiber 70 for transmitting the light and a light detector 60*b* for reconverting the transmitted light to electrical signals. An optical connector 50*a* couples light from light source 60*a* into optical fiber 70 and another optical connector 50*b* couples light from optical fiber 70 into light detector 60*b*. Light source 60*a* must be accurately arranged with respect to optical fiber 70 in order to optimize the coupling of light into optical fiber 70. Optical fiber 70 must also be accurately arranged with respect to light detector 60*b* in order to optimize the coupling of light from optical fiber 70 into detector 60*b*. The transfer of optical signals between source 60*a* and detector 60*b*, then, should be optimized to reduce the signal power loss and enable restoration of the serial data electrical signal originally transmitted. Therefore, it is very important to accurately align the output beam of light source 60*a* to optical fiber 70 and the output beam from optical fiber 70 to light detector 60*b* at optical connectors 50*a* and 50*b*, respectively.

Generally, light source 60*a* can be a laser diode (e.g. an edge emitting laser diode or a surface emitting laser diode) or LED and detector 60*b* can be a photodiode, although any other source of light or detection system can be used. An edge emitting laser diode should be diced for testing of the chip characteristics. A surface emitting laser diode, however, enables testing of chip characteristics on the wafer unit without dicing and is suitable for mass production. Additionally, surface emitting laser diodes have the advantage of requiring a lower driving current driver (e.g., laser driver 30) than edge emitting laser diodes. Also, because the light beam from an edge emitting laser diode is badly distorted with an elliptical shape, it is more difficult to couple the beam into the circularly shaped cross section of the optical fiber. An emitted light beam from a surface emitting laser diode can be the same circular shape as the cross section of the optical fiber and most of the light beam emitted can be coupled into the optical fiber. Therefore, surface emitting laser diodes are better suited for a passive alignment method because the passive alignment method is less accurate than the active alignment method.

Optical fiber 70 can be classified as single mode or multi-mode depending on a core size of optical fiber 70, which is typically made from silica or plastic. A single mode optical fiber is more suitable than multi-mode optical fibers for high-speed, long-distance transmission of data. Optical fibers made from silica have better transmission properties, leading to less power loss, than optical fibers made from plastic. Because the core diameter of a single mode silica optical fiber is less than about 10 $\mu$m, it is very difficult to align source 60*a* to optical fiber 70 in order to couple light from light source 60*a* to optical fiber 70. Therefore, connector 50*a* needs to be a high accuracy optical connector. Alternatively, a multi-mode optical fiber having a core diameter of more than 50 or 62.5 $\mu$m requires relatively little accuracy in alignment in order to couple light from source 60*a* to optical fiber 70. A plastic optical fiber typically has a core diameter of about 250~1000 $\mu$m and therefore it is relatively easy to couple light into and out of the plastic optical fiber.

Figure 5:
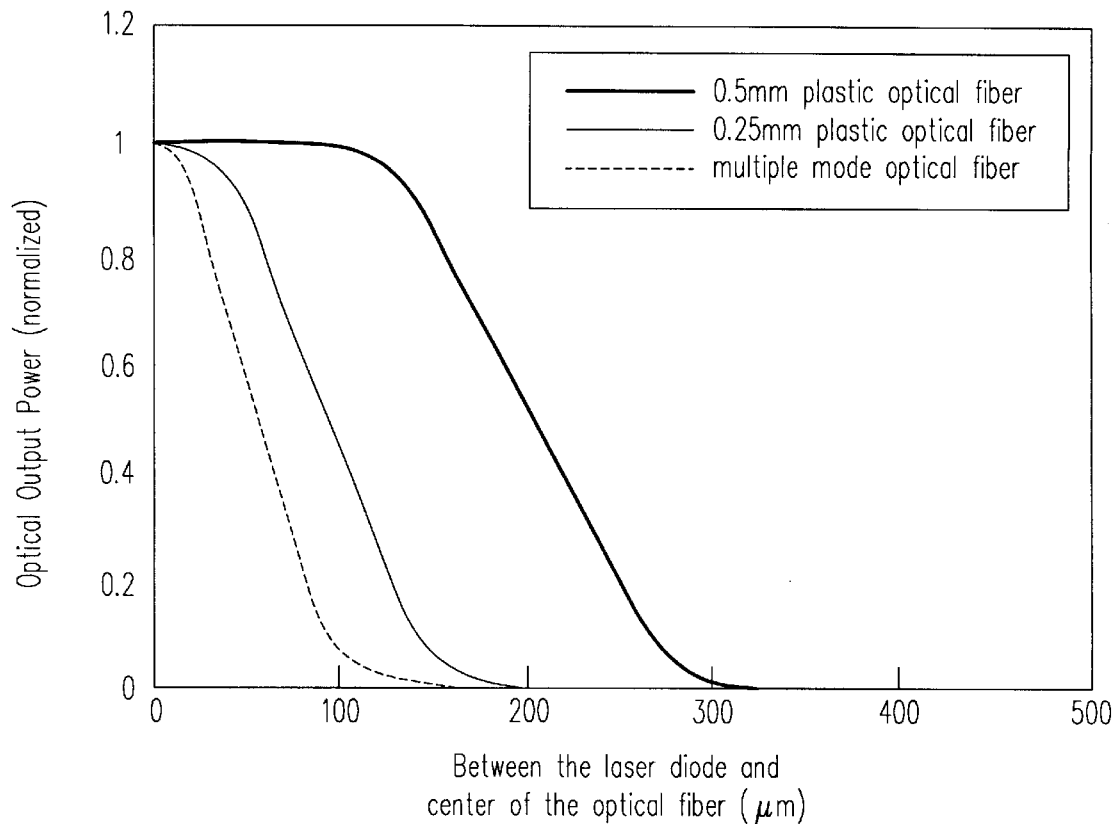
FIG. 5 shows the variation of the output power from an optical fiber depending on the misalignment between the beam from a laser diode and the center of the cross-section of an optical fiber.

FIG. 5 shows that the plastic optical fiber, with a core diameter of 0.5 mm, has an output power nearly 100% of the maximum output power even if the light beam from the light source is miss-aligned by about 100 $\mu$m from the center of the optical fiber. In contrast, if multi-mode optical silica fiber with a core diameter of 0.0625 mm is misaligned by approximately 20 $\mu$m, the output power of the optical fiber is sharply reduced.

As an additional difficulty, a typical photodiode utilized in high-speed transmission systems has a light receiving area with diameter of about 100~200 $\mu$m. Because the photodiode has such a small diameter, optical fiber 70 needs to be precisely aligned with photodiode 60*b* in optical connector 50*b*.

Figure 6C:
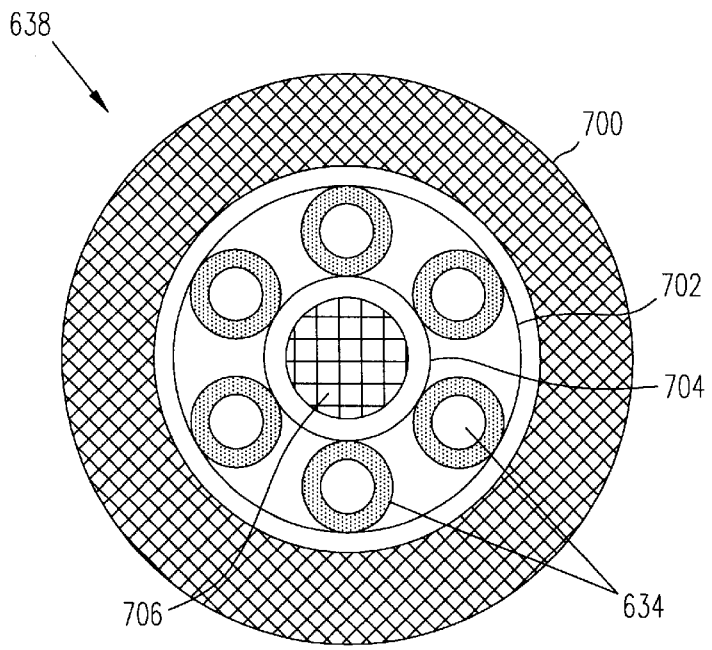
FIG. 6C shows a cross section of an exemplary fiber cable.
Figure 6A:
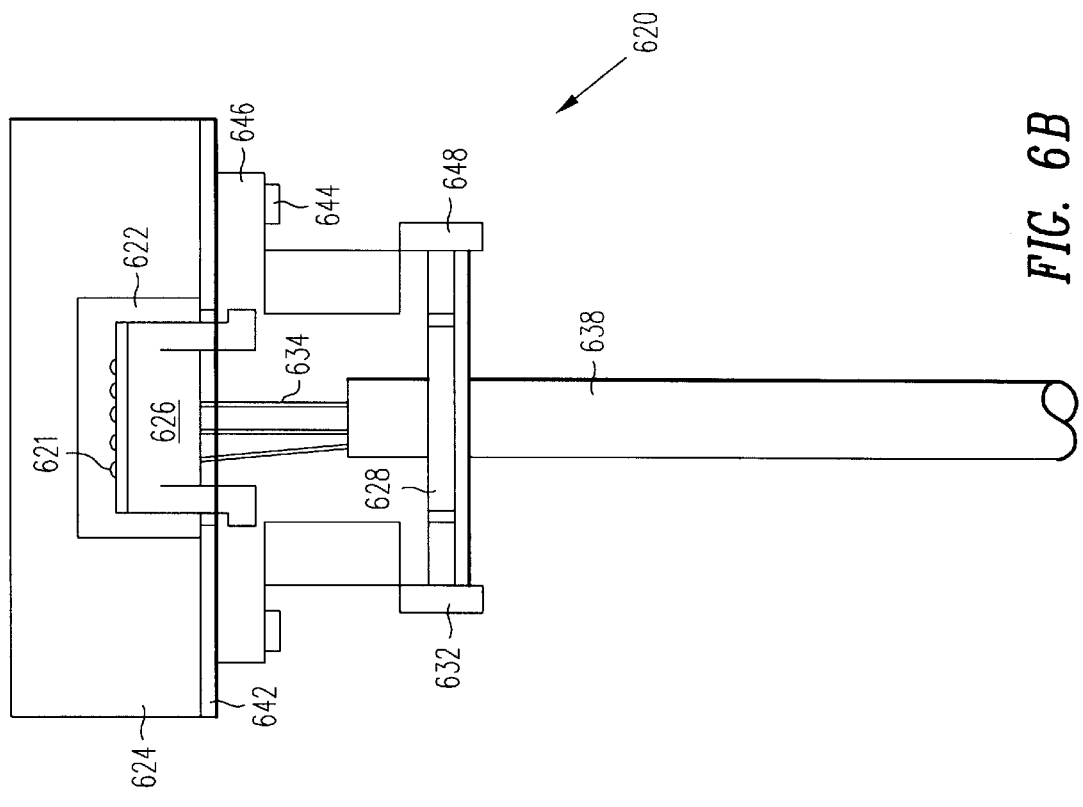
FIG. 6A shows an optical connector in accordance with the present invention just prior to insertion into the optical transmitter module or the optical receiver module.
Figures 7A, 7B, 7C:
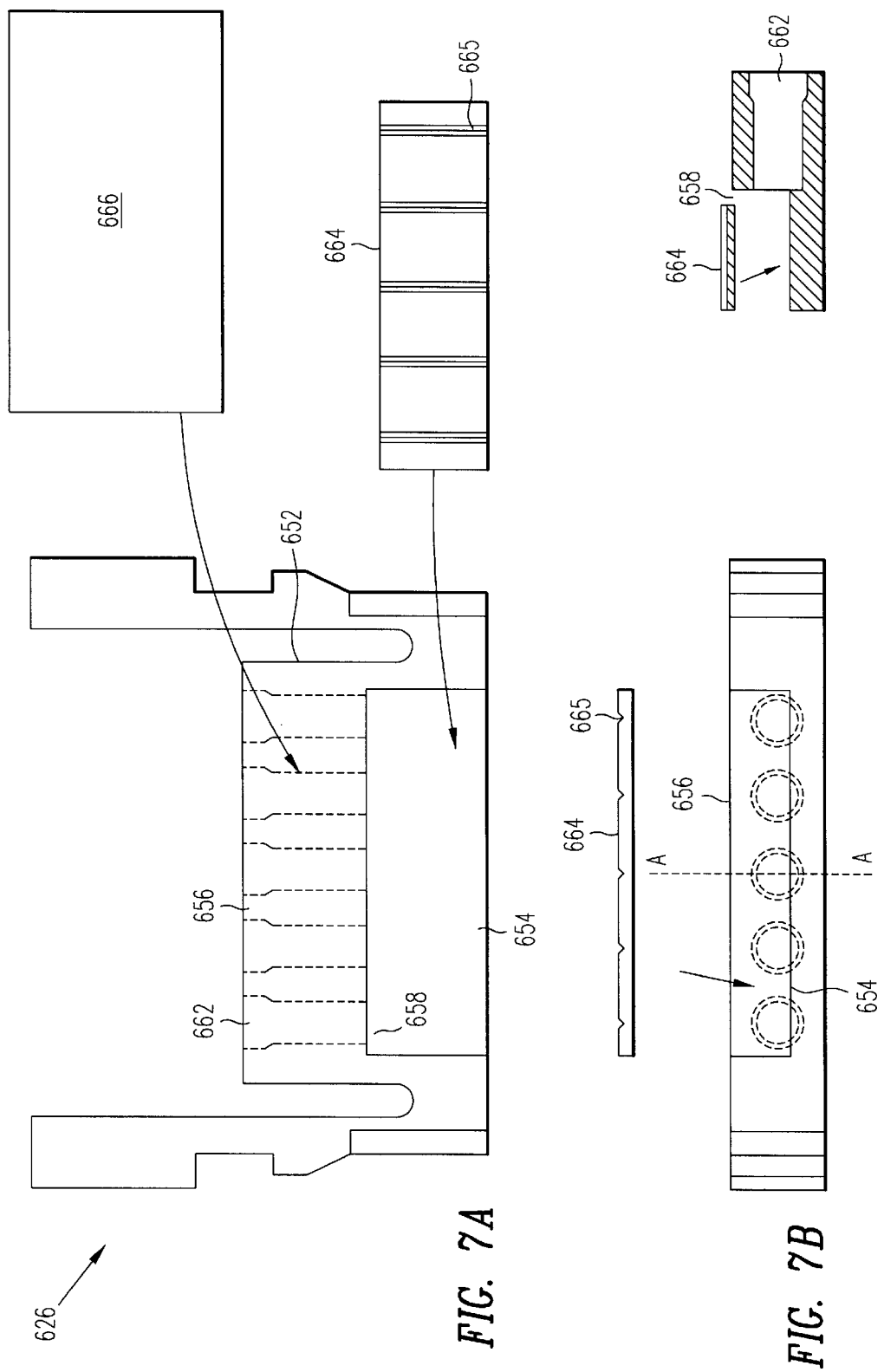
FIG. 7A is a plan view of the multi channel optical fiber block used in the optical connector of FIG. 6A and FIG. 6B.
FIG. 7B is an elevation view of the multi-channel optical fiber block used in the optical connector of FIG. 6A and FIG. 6B.
FIG. 7C is a side view of the multi-channel optical fiber block used in the optical connector of FIG. 6A and FIG. 6B.

FIG. 6A shows one embodiment of an optical connector 620 in accordance with the present invention just prior to insertion into a optical device array block 622, which can be mounted on a circuit board 624. Connector 620 includes a multi-channel optical fiber block 626, a stopper 628 and a housing 632. Connector 620 provides accurate alignment of fibers 634 with optical devices 621. Optical devices 621 can include any combination of light sources and detectors. The accurate placement of such optical devices in optical device array block 622 is discussed in copending U.S. application entitled "Multichannel Optical Transmitter/Receiver Module and Manufacturing Method Thereof" Ser. No. 09/608,207, filed Jun. 30, 2000, herein incorporated by reference in its entirety. Connector 620 also includes a cable 638 of rugged construction and strain relief for cable 638. Multi-channel optical fiber block 626 captures fibers 634 and, when inserted in optical device array block 622, aligns fibers 634 with optical devices 621 that are part of optical array device block 622. Multi-channel optical fiber block 626 includes a V-groove block 652 (FIG. 7A) and a cover 666 (FIG. 7A). Housing 632 is slidably mounted on cable 638 before stopper 628 is attached to cable 638.

FIG. 6C shows a cross section of one embodiment of a cable 638 which contains fibers 634. Cable 638, for example, can be a Fiber Instrument Sales, Inc. Part Number 604-2N-CB-62PFD. Cable 638 of FIG. 6C includes a dielectric central strength member 706 surrounded by a central member upjacket 704. Buffered optical fibers 634 are arranged around central strength member 706 and held in place by aramid yarn strength member 702. Cable 638 is surrounded by outer jacket 700. The Fiber Instrument Sales cable, for example, has a nominal diameter of 5.9 mm and 900 $\mu$m jacketed fiber 634 with a 0.0625 mm core within it. The diameter of Fiber Instrument Sales cable can be in the range of about 5.6 mm to about 9.4 mm. Although one particular embodiment of cable is described with a given nominal external diameter and having 900 $\mu$m buffered fibers having 0.0625 mm core, the present invention is adaptable to various nominal diameter cables. It is also adaptable to all fibers of any core diameter.

FIGS. 6D and 6E show one embodiment of the placement of stopper 628 on cable 638. Stopper 628 includes a first portion 628*a* and a second portion 628*b* which fit over cable 638. First portion 628*a* and second portion 628*b* form a passage 710 which is smaller than the diameter of cable 638. First portion 628*a* and second portion 628*b* are positioned on cable 638 and, as shown in FIG. 6E, snapped into place, preventing the motion of cable 638 with respect to stopper 628. In some embodiments, an adhesive is applied to better attach stopper 628 to outerjacket 700 of cable 638. Although one example of stopper 628 is illustrated in FIGS. 6D and 6E, one skilled in the art will recognize that other stopper arrangements can be utilized.

Figure 6B:
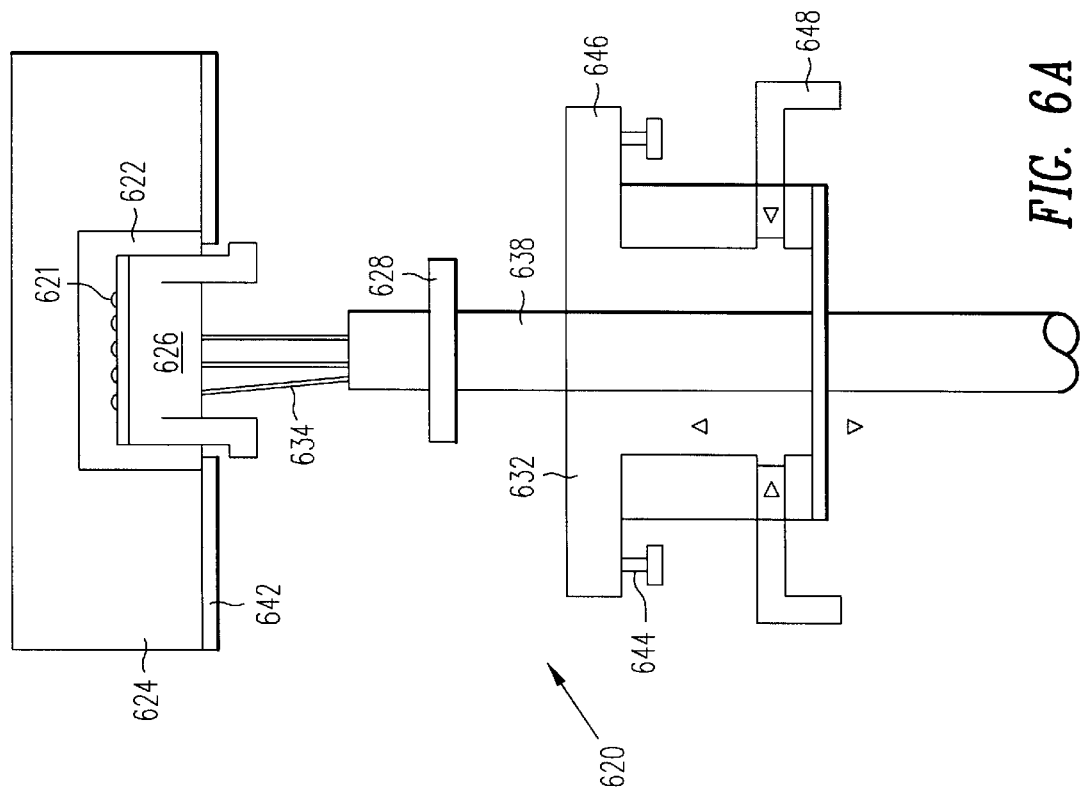
FIG. 6B shows the optical connector of FIG. 6A installed on an optical transmitter module or optical receiver module.

FIG. 6B shows optical device array block 622 coupled to optical connector 620. Multi-channel optical fiber block 626 is plugged into device array block 622. Housing 632 is slid over cable jacket to contact stopper 628. Stopper 628 is mounted at a predetermined position on cable 638 so that when housing 632 contacts stopper 628 flanges 646 of housing 632 are in contact with mounting plate 642 and fibers 634 are not strained. Mounting plate 642 is integral with optical device array block 622 and can be attached to optical device array block 622 or can be separately mounted to circuit board 624. Screws 644 located on flanges 646 are tightened to attach housing 632 to mounting plate 642. Other embodiments may use other attachment means to attach housing 632 to mounting plate 642. After housing 632 is attached to mounting plate 642 cable holding buttons 648 are pushed into a locked position. Buttons 648, in locked position, capture stopper 628 between the wall of housing 632 and buttons 648. In this state, stopper 628 is prevented from rotating or translating, thus, cable 638 to which stopper 628 is attached fixedly cannot translate or rotate. Buttons 648 can also contact the jacket of cable 638 thereby aiding stopper 628 in preventing the translation or rotation of cable 638. The cores of fibers 634 are aligned with optical devices 621, which can be light sources 60a or detectors 60b (FIG. 4), in such manner as to reduce the loss of optical signal being transmitted to and from fibers 634. By preventing translation and rotation of the cable, fibers 634 in the connection are strain relieved and thereby the interruption or degradation of signal transmission due to movement of the connector core 626 is reduced.

Figure 6F:
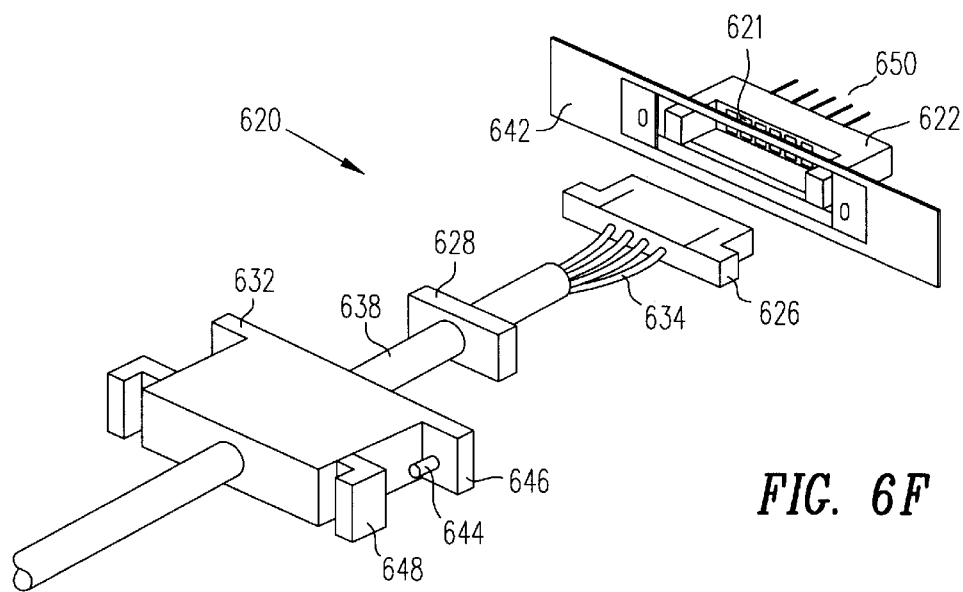
FIGS. 6F, 6G, and 6H show an embodiment of an optical connector assembled on a panel mount.
Figure 6G:
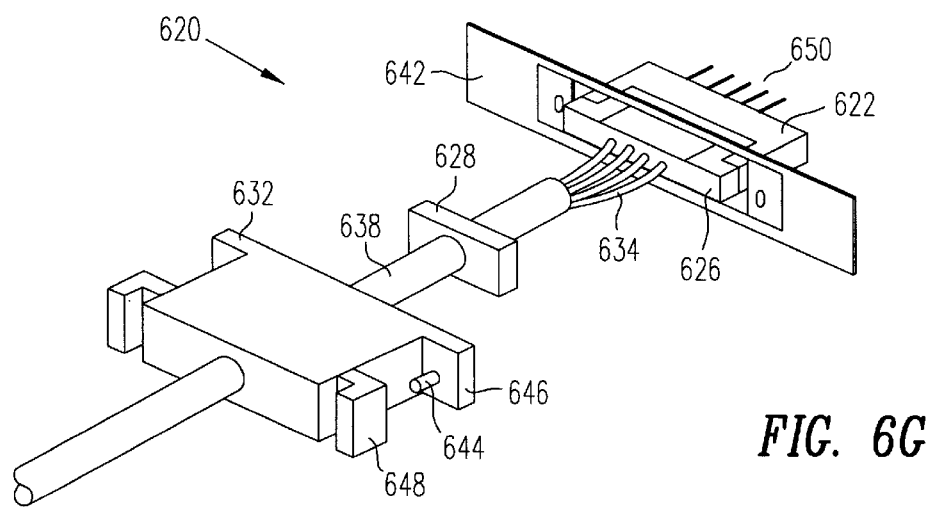
Figure 6H:
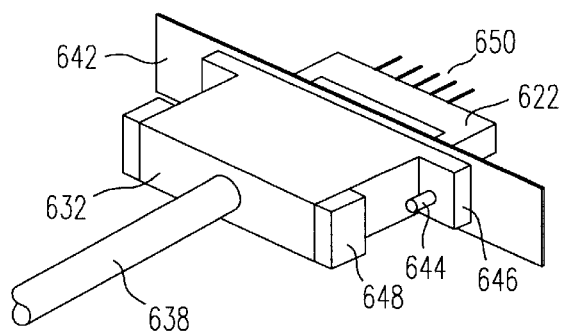

FIGS. 6F, 6G and 6H illustrate a connection between optical connector 620 and optical device array block 622. In FIG. 6F, optical connector 620 is separated from optical device array block 622. Mounting plate 642 is attached to optical device array block 622 and can further be attached to a panel (not shown) in order to provide panel connections. Optical device array block 622 includes metal leads 650 in order to provide electrical coupling to optical devices 621. In FIG. 6G, multi-channel optical fiber block 626 is coupled into optical device array block 622. Optical fibers 634 are aligned with optical devices 621 when multi-channel optical fiber block 626 is snapped into optical device array block 622. In FIG. 6H, housing 632 is slid along cable 638 in order to fix stopper 628 within housing 632 and make contact with mounting plate 642. Finally, housing 632 is attached (for example with screws 644) to mounting plate 642 and buttons 648 are depressed to lock stopper 628 in place relative to housing 632.

FIG. 7A, FIG. 7B, and FIG. 7C are a plan view, an elevation, and a side view, respectively, of one embodiment of a multi-channel optical fiber block 626. Multi-channel optical fiber block 626 of FIG. 7A includes a first portion 654 and a second portion 656. First portion 654 receives a silicon V-groove block 664 having V-grooves 665 for positioning individual unjacketed optical fibers. V-grooves 665 in silicon V-groove block 664 have higher achievable tolerance for alignment of optical fibers 634 than V-grooves formed in conventional plastic molding and is amenable to mass production. V-grooves 665 having uniform intervals for aligning optical fibers 634 (FIG. 6A) can be made in V-groove block 664, for example by using standard MEMS processing techniques. Second portion 656 has bores 662, which are produce, for example, by plastic molding. When V-groove block is attacheably placed into first portion 654, each V-groove 665 is aligned with one of bores 662 so that when bare fiber 634 is placed in V-groove 665 the center of fiber 634 is aligned with center of bore 662. However, there can be minor misalignment between V-groove 665 and bore 662. To ensure that fiber 634 are not subjected to excessive stress due to the misalignment, a trench 658 is located between V-groove 665 and bore 662. One end of bore 662 is enlarged to facilitate application of epoxy. When assembled, a cover 666 is placed over first portion 656 and second portion 654 in order to protect and help hold optical fibers 634 in place.

FIGS. 7D, 7E and 7F are a plan view, an elevation, and a side view, respectively, of a second embodiment of a multi-channel optical fiber block 626. Multi-channel optical fiber block 626 of FIGS. 7D, 7E and 7F include first portion 656 and second portion 654. V-grooves 665, however, are formed directly in second portion 654 instead of being separately produced in silicon V-block 664 (FIG. 7A). Therefore, V-grooves 665 are produced in plastic along with the plastic portions of multi-channel fiber block 626 by plastic molding. The remaining portions of the second embodiment shown in FIGS. 7D, 7E and 7F are substantially identical with the first embodiment of FIGS. 7A, 7B and 7C.

Figure 7G:
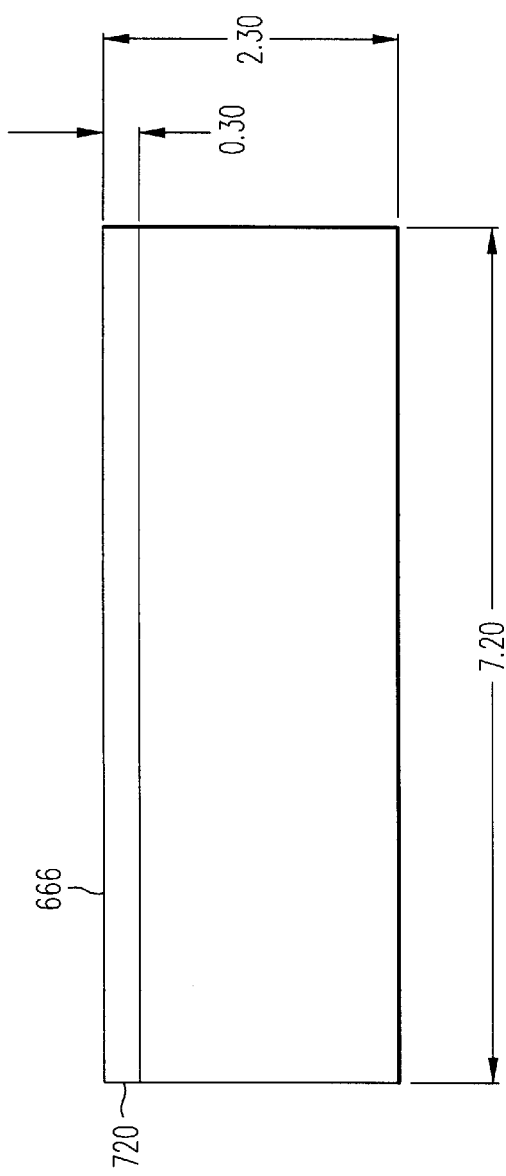
FIGS. 7G, 7H, and 7I are a plan view, an elevation, and a side view, respectively, of an example of a cover for a multi-channel optical fiber block.
Figure 7H:
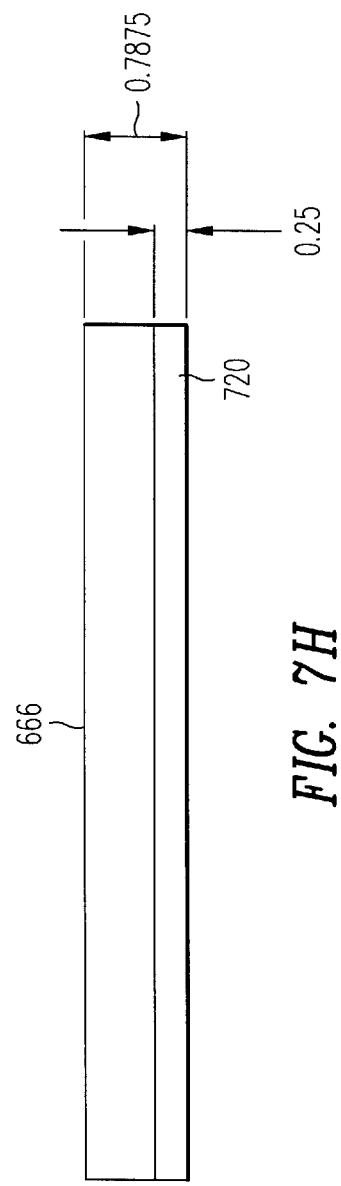
Figure 7I:
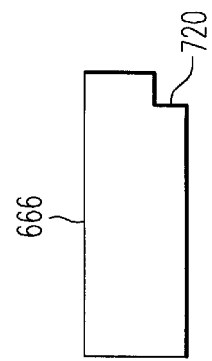

FIGS. 7G, 7H, and 7I are a plan view, an elevation, and a side view, respectively, of an example of cover 666 for multi-channel optical fiber block 626. In one embodiment, cover 666 has a lip 720 so that a portion sites within the remainder of multi-channel optical fiber block 626. In one embodiment, cover 666 is about 7.20 mm long, about 2.30 mm wide, and about 0.7875 mm deep. An about 0.25 mm deep lip 720 is formed along the longest edge. Lip 720 has a width of about 0.30 mm.

FIGS. 8A and 8B shows multi-channel optical fiber block 626, cover 666 and fiber 634 placed in V-groove 665 through bore 662. FIG. 8B illustrates how trench 658 helps reduce stress on fiber 634 when there is a misalignment between the V-groove 665 and the center of bore 662. Trench 658 ensures that the transition of fiber 634 from bore 662 to V-groove 665 is not abrupt thereby assuring that fiber 634 is not stressed excessively due to bending. In the absence of trench 658, as illustrated in FIG. 8A, fiber 634 will experience distortion at the junction of V-groove 665 and bore 662 and therefore fiber 634 can be stressed. High stress in fiber 634 results in high transmission loss for the optical signal and a reduction in useful life of the optical fiber.

Figure 9:
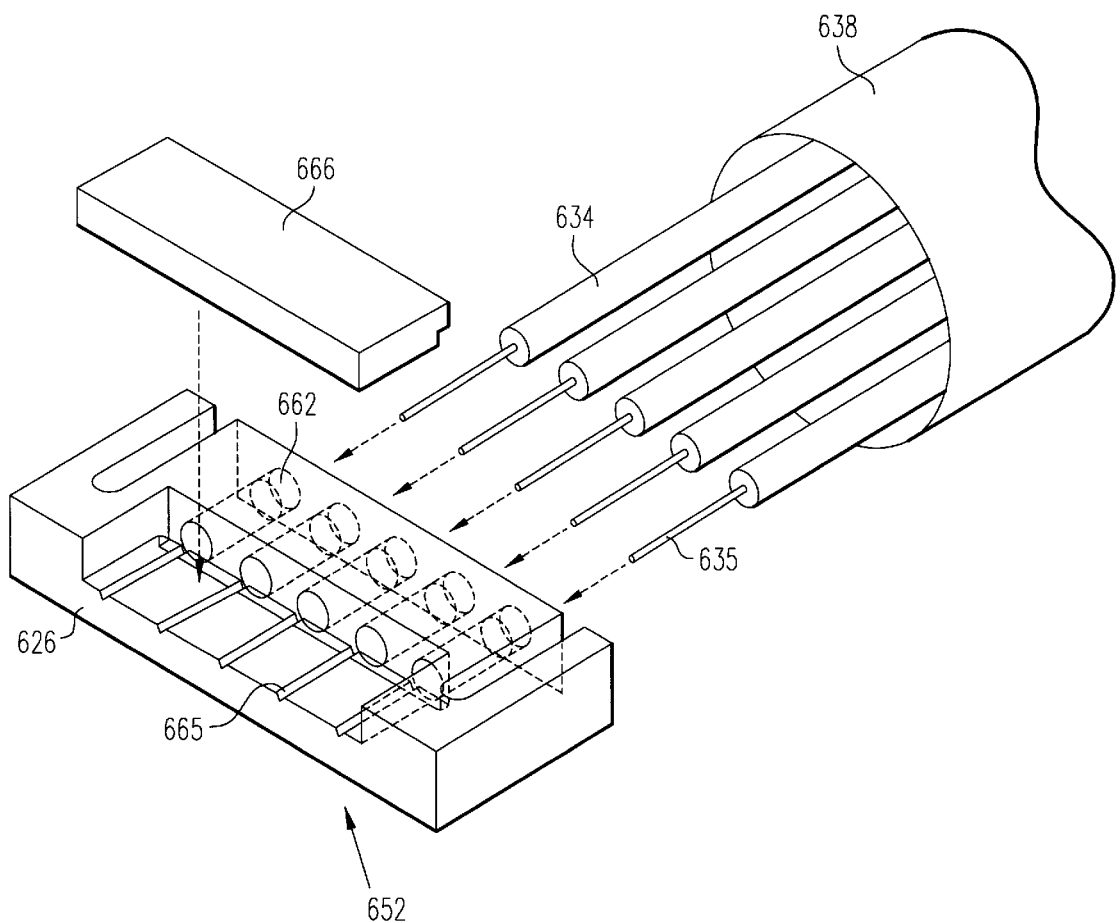
FIG. 9 shows a method of capturing fiber in a multi-channel optical fiber block.

FIG. 9 illustrates the method of capturing fiber 634 in multi-channel optical fiber block 626. Fiber 634 is first stripped of its jacket to obtain bare fiber 635. Fiber 634 along with bare fiber 635 is inserted in bore 662. This would bring fiber 635, the bare fiber portion of fiber 634, in V-groove 665 and the jacketed portion of fiber 634 would be in bore 662. Next, epoxy is inserted in each bore 662 through the bore's enlarged end, over each V-groove 665 and between cover 666 and V-grooves 665. Cover 666 is placed over first portion having V-groove 664 and trench 658. The epoxy is cured thereby capturing fibers 634 in block 652. Cover 666 can be made from silicon. One advantage of this method over the conventional methods is that the jacket is captured in core 626, thereby providing strain relief for fiber 635.

Figure 10:
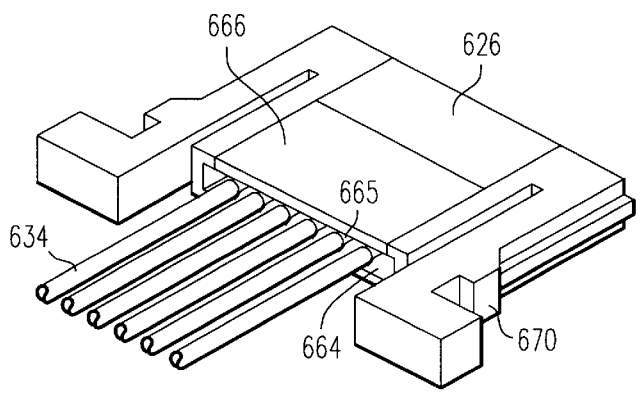
FIG. 10 shows an assembled multi-channel optical fiber block according to the present invention.

FIG. 10 shows an assembled multi-channel optical fiber block 626 with retainer clip 670. Multi-channel optical fiber block 626 is complementary to optical device array block 622. Therefore, multi-channel optical fiber block 626, when plugged into optical device array block 622, locks in place to accurately align core of fibers 635 with optical devices 621 Connector 50a and 50b (FIG. 4) are similar in construction and can be interchangeable. They can be mass produced and can be used with any mass produced set of modules 61a and 61b.

While particular embodiments of the present invention have been described it will be apparent to those skilled in the art that changes and modifications may be made without departing from this invention in its broader aspect. Therefore, the invention of this application is limited only by the following claims.

We claim:

1. An optical connector, comprising:
   a multi-channel optical fiber block capable of being pluggably attached with an optical device array block, wherein the multi-channel optical fiber block comprises:

a connector body having a first portion and a second portion, the first portion having V-grooves, the second portion having bores aligned with the grooves, and a trench occupying the space between the V-grooves and the bores; and a cover;

wherein optical fibers are captured in the V-grooves of the connector body;

a fiber cable having a jacket;

at least one optical fiber enclosed in the jacket of the fiber cable, a length of the fiber being captured in the multi-channel optical fiber block;

a stopper fixedly mounted on the jacket of the cable; and a housing mounted on the jacket of the cable, the housing capturing the stopper and being capable of covering the multi-channel optical fiber block.

2. An optical connector, comprising:

a multi-channel optical fiber block capable of being pluggably attached with an optical device array block;

a fiber cable having a jacket, wherein the external diameter of the fiber cable is in the range of 5.6 millimeter to 9.4 millimeter;

at least one optical fiber enclosed in the jacket of the fiber cable, a length of the fiber being captured in the multi-channel optical fiber block;

a stopper fixedly mounted on the jacket of the cable; and a housing mounted on the jacket of the cable, the housing capturing the stopper and being capable of covering the multi-channel optical fiber block.

3. An optical connector, comprising:

a multi-channel optical fiber block capable of being pluggably attached with an optical device array block;

a fiber cable having a jacket;

at least one optical fiber enclosed in the jacket of the fiber cable, a length of the fiber being captured in the multi-channel optical fiber block;

a stopper fixedly mounted on the jacket of the cable; and a housing mounted on the jacket of the cable, the housing capturing the stopper, thereby preventing the translation and the rotation of the fiber cable, and being capable of covering the multi-channel optical fiber block.

4. An optical connector, comprising:

a multi-channel optical fiber block capable of being pluggably attached with an optical device array block;

a fiber cable having a jacket;

at least one optical fiber enclosed in the jacket of the fiber cable, a length of the fiber being captured in the multi-channel optical fiber block;

a stopper fixedly mounted on the jacket of the cable; and a housing mounted on the jacket of the cable, the housing capturing the stopper and being capable of covering the multi-channel optical fiber block, wherein the housing comprises:

a body having a first end, a second end, a first side and a second side, the first end defining a bore; and flanges formed at the second end, each flange defining a hole to accept a mounting screw.

5. The optical connector of claim 4 wherein the housing further comprises a cable holding button slidably attached to the first side and the second side.

6. The optical connector of claim 5, wherein the housing can slide along the fiber cable when the cable holding buttons are unlocked.

7. The optical connector of claim 5, wherein the housing is fixedly attached to the fiber cable when the cable holding buttons are locked.

8. A method of connecting an optical connector to a device module, the method comprising:

inserting a multi-channel optical fiber block in the device module;

sliding a housing on a cable to meet a mounting plate on a circuit board;

engaging tightly screws on housing flanges with threads on the mounting plate; and locking a cable holding button to capture a stopper in a holder, thereby preventing translation and rotation of the cable.

9. An optical connector assembly comprising:

an optical cable having a plurality of fiber;

a housing slidably mounted on the cable, the housing having cable holding buttons;

a stopper fixedly mounted on the cable;

a multi-channel optical fiber block having the fibers captured in the multi-channel optical fiber block; and a device module mounted on a circuit board, wherein the multi-channel optical fiber block is inserted in the device module, and the housing is attached to a mounting rack on the circuit board thereby capturing the stopper and preventing the cable from translation or rotation.

10. An optical signal transmission system comprising:

an optical transmitter module attached to a first mounting rack;

an optical receiver module attached to a second mounting rack;

an optical cable having a plurality of fibers;

a housing slidably mounted on each end of the cable, the housing having cable holding buttons;

a stopper fixedly mounted on each end of the cable; and a multi-channel optical fiber block attached at each end of the cable, the multi-channel optical fiber block having the fibers captured in the multi-channel optical fiber block;

wherein one multi-channel optical fiber block is inserted in the transmitter module, the other multi-channel optical connector block is inserted in the receiver module, and each of the housing is attached to corresponding mounting rack thereby capturing the stopper and preventing the cable from translation or rotation.

11. A multi-channel optical fiber block, comprising:

a first portion having V-grooves for receiving a bare portion of at least one optical fiber;

a second portion having bores for receiving a buffered portion of the at least one optical fiber; and a trench located between the first portion and the second portion, wherein the at least one optical fiber is aligned with one of at least one optical devices in an optical device array block when the optical fiber array block is plugged into the optical device array block.

12. The block of claim 4, wherein the V-grooves are produced in a silicon V-block which is inserted into the first portion.

13. The block of claim 4, wherein the V-grooves are produced in the first portion by plastic molding.

* * * * *